(12) United States Patent
Lee et al.

(10) Patent No.: US 11,026,116 B2
(45) Date of Patent: Jun. 1, 2021

(54) APPARATUS AND METHOD FOR GENERATING A BUFFER STATUS REPORT

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/498,345

(22) PCT Filed: May 3, 2018

(86) PCT No.: PCT/KR2018/005154
§ 371 (c)(1),
(2) Date: Sep. 26, 2019

(87) PCT Pub. No.: WO2018/203688
PCT Pub. Date: Nov. 8, 2018

(65) Prior Publication Data
US 2020/0077293 A1    Mar. 5, 2020

Related U.S. Application Data

(60) Provisional application No. 62/501,106, filed on May 4, 2017.

(51) Int. Cl.
*H04W 28/02* (2009.01)
*H04W 72/12* (2009.01)
*H04W 72/14* (2009.01)

(52) U.S. Cl.
CPC ... *H04W 28/0278* (2013.01); *H04W 72/1242* (2013.01); *H04W 72/1284* (2013.01); *H04W 72/14* (2013.01)

(58) Field of Classification Search
CPC ......... H04W 28/0278; H04W 72/1242; H04W 72/1284; H04W 72/14
See application file for complete search history.

(56) References Cited

U.S. PATENT DOCUMENTS 8,687,565 B2 *   4/2014   Chun ................... H04W 28/06
                                                   370/329
2013/0114445 A1   5/2013   Wen et al.
(Continued)

OTHER PUBLICATIONS

PCT International Application No. PCT/KR2018/005154, Notification of Transmittal of the International Search Report and the Written Opinion of the International Searching Authority, or Declaration dated Aug. 10, 2018, 11 pages.
(Continued)

*Primary Examiner* — Ajay Cattungal
(74) *Attorney, Agent, or Firm* — Lee Hong Degerman Kang Waimey

(57) ABSTRACT

The method for a user equipment (UE) generating a buffer status report (BSR) comprises receiving logical channel configuration information from a network, the logical channel configuration information including information related to a plurality of numerologies mapped to each logical channel; when the BSR is triggered, calculating a buffer size of each numerology based on the logical channel configuration information; and generating a BSR including buffer size information of at least one numerology in decreasing order of numerology priority.

13 Claims, 6 Drawing Sheets

(56) References Cited

U.S. PATENT DOCUMENTS

| | | | |
|---|---|---|---|
| 2018/0270699 A1* | 9/2018 | Babaei | H04W 72/1284 |
| 2018/0270700 A1* | 9/2018 | Babaei | H04W 72/1284 |
| 2018/0270869 A1* | 9/2018 | Tsai | H04W 74/006 |
| 2018/0279331 A1* | 9/2018 | Shaheen | H04W 72/1205 |
| 2018/0288631 A1* | 10/2018 | Wei | H04W 24/02 |

OTHER PUBLICATIONS

Samsung, BSR for Multiple Numerology Operation, 3GPP TSG RAN WG2 NR Meeting #97bis, R2-1703016, Apr. 2017, 3 pages.
Ericsson, "SR and BSR signalling content in NR", 3GPP TSG RAN WG2 Meeting #97bis, R2-1702745, Apr. 2017, 5 pages.
LG Electronics, "BSR enhancement for New RAT", 3GPP TSG RAN WG2 Meeting #97bis, R2-1703492, Apr. 2017, 3 pages.
Huawei, et al., "LCP with Multiple Numerologies", 3GPP TSG RAN WG2 Meeting #97bis, R2-1702602, Apr. 2017, 4 pages.

* cited by examiner (a) Control-Plane Protocol Stack (b) User-Plane Protocol Stack

FIG. 4

| LCG ID | Buffer Size | Oct 1 |

FIG. 5

| Buffer Size #0 | Buffer Size #1 | Oct 1 |
| Buffer Size #1 | Buffer Size #2 | Oct 2 |
| Buffer Size #2 | Buffer Size #3 | Oct 3 |

FIG. 6

| Destination index$_1$ | LCG ID$_1$ | Buffer Size$_1$ | Oct 1 |
| Buffer Size$_1$ | Destination index$_2$ | Oct 2 |
| LCG ID$_2$ | Buffer Size$_2$ | Oct 3 |

...

| Destination index$_{N-1}$ | LCG ID$_{N-1}$ | Buffer Size$_{N-1}$ | Oct 1.5 * N − 2 |
| Buffer Size$_{N-1}$ | Destination index$_N$ | Oct 1.5 * N − 1 |
| LCG ID$_N$ | Buffer Size$_N$ | Oct 1.5 * N |

| Destination index₁ | | LCG ID₁ | Buffer Size₁ | Oct 1 |
| Buffer Size₁ | | Destination index₂ | | Oct 2 |
| LCG ID₂ | Buffer Size₂ | | | Oct 3 |

...

| Destination index_N | | LCG ID_N | Buffer Size_N | Oct 1.5 * N − 0.5 |
| Buffer Size_N | R | R | R | R | Oct 1.5 * N + 0.5 |

APPARATUS AND METHOD FOR GENERATING A BUFFER STATUS REPORT

CROSS-REFERENCE TO RELATED APPLICATIONS

This application is the National Stage filing under 35 U.S.C. 371 of International Application No. PCT/KR2018/005154, filed on May 3, 2018, which claims the benefit of U.S. Provisional Application No. 62/501,106, filed on May 4, 2017, the contents of which are all hereby incorporated by reference herein in their entirety.

TECHNICAL FIELD

The present invention relates to wireless communication, and more particularly, to apparatus and method for generating buffer status report.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device. eNode B 20 may be reffered to as eNB and gNode B (gNB), etc. However, in the following explanation, the term 'UE' and 'eNodeB' are used for convenience.

FIG. 2 is a block diagram depicting architecture of a typical E-UTRAN and a typical EPC.

As illustrated in FIG. 2, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated in FIG. 2, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer (L1) of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA)

scheme in downlink and is modulated using a single carrier frequency division multiple access (SC-FDMA) scheme in uplink.

The MAC layer (L2) of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

In the development to a New Radio Access Technology (NR), NR system should be able to use frequency bands up to 100 GHz. In NR, random access (RA) procedure may be an essential procedure for all UEs when establishing an RRC Connection or scheduling, increased latency. It is not desirable that random access preamble collision between UEs is not desirable. Therefore, a new method is required in supporting RA procedure with NR system.

DISCLOSURE

Technical Problem

An object of the present invention devised to solve the problem lies in method for a user equipment (UE) transmitting a buffer status report (BSR).

Another object of the present invention is to provide a user equipment (UE) for transmitting a buffer status report (BSR).

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for a user equipment (UE) generating a buffer status report (BSR) comprises receiving logical channel configuration information from a network, the logical channel configuration information including information related to a plurality of numerologies mapped to each logical channel; when the BSR is triggered, calculating a buffer size of each numerology based on the logical channel configuration information; and generating a BSR including buffer size information of at least one numerology in decreasing order of numerology priority.

Buffer size information of a first numerology having a highest numerology priority is first included in the BSR, and followed by buffer size information of a second numerology having a next highest numerology priority. The numerology priority can be configured by the network. The numerology priority of a numerology is determined by the UE based on a highest logical channel priority of the logical channels which are mapped to the numerology, wherein the logical channel priority can be configured by the network. Priority of a first numerology mapped to a first set of logical channels is higher than that of a second numerology mapped to a second set of logical channels if a highest logical channel priority of the first set of the logical channels is higher than a highest logical channel priority of the second set of the logical channels. The generating comprises truncating buffer size information of at least one numerology in increasing order of numerology priority when an uplink grant is not enough to include buffer size information of each of numerologies in the BSR. The calculating the buffer size of each numerology comprises calculating a first sum of buffer sizes of logical channels mapped to a first numerology; and calculating a second sum of buffer sizes of logical channels mapped to a second numerology. The method further comprises transmitting the BSR to the network.

In another aspect of the present invention, provided herein is a user equipment (UE) a receiver configured to receive logical channel configuration information from a network, the logical channel configuration information including information related to a plurality of numerologies mapped to each logical channel; a processor configured to: when the BSR is triggered, calculate a buffer size of each numerology based on the logical channel configuration information; and generate a BSR including buffer size information of at least one numerology in decreasing order of numerology priority. Buffer size information of a first numerology having a highest numerology priority is first included in the BSR, and followed by buffer size information of a second numerology having a next highest numerology priority. The numerology priority is configured by the network. The processor is configured to determine numerology priority of a numerology based on a highest logical channel priority of the logical channels which are mapped to the numerology, wherein the logical channel priority is configured by the network. Priority of a first numerology mapped to a first set of logical channels is higher than that of a second numerology mapped to a second set of logical channels if a highest logical channel priority of the first set of the logical channels is higher than a highest logical channel priority of the second set of the logical channels. For the generating, the processor is configured to truncate buffer size information of at least one numerology in increasing order of numerology priority when an uplink grant is not enough to include buffer size information of each of numerologies in the BSR. For calculating the buffer size of each numerology, the processor is configured to: calculate a first sum of buffer sizes of logical channels mapped to a first numerology; and calculate a second sum of buffer sizes of logical channels mapped to a second numerology.

Advantageous Effects

According to embodiment according to the present invention, the UE can generate BSR by truncating numerology or including selected numerology when uplink grant is not enough to include buffer size for all numerologies so that communication performance is enhanced.

It will be appreciated by those skilled in the art that the effects that can be achieved through the embodiments of the present disclosure are not limited to those described above and other effects of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 4 is a diagram illustrating a short BSR and Truncated BSR MAC control element.

FIG. 5 is a diagram illustrating a long BSR and Truncated BSR MAC control element.

FIG. 6 is a diagram illustrating sidelink BSR and Truncated sidelink BSR MAC control element for even N.

MODE FOR INVENTION

Figure 1:
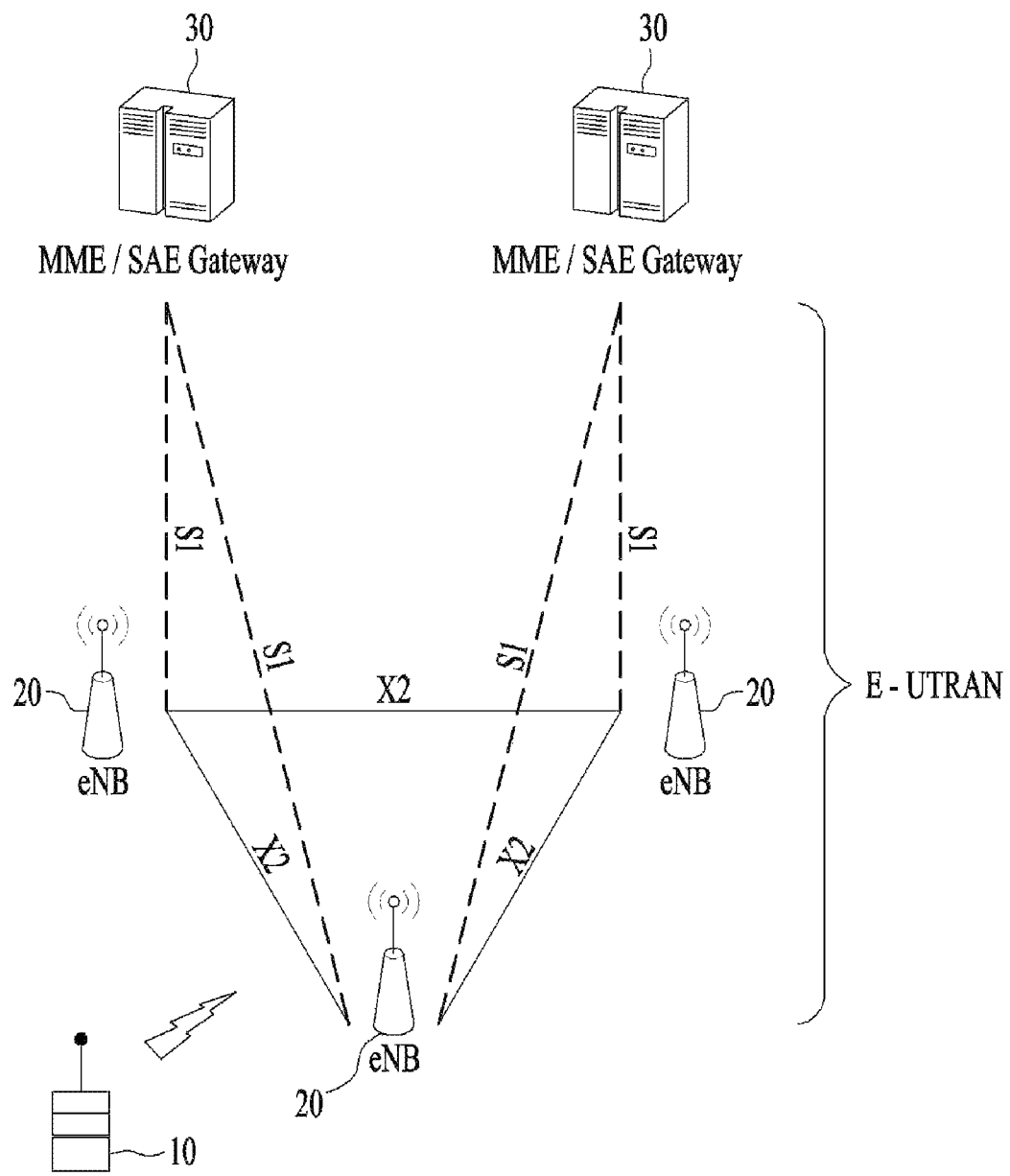
FIG. 1 is a block diagram illustrating network structure of an evolved universal mobile telecommunication system (E-UMTS).
Figure 2:
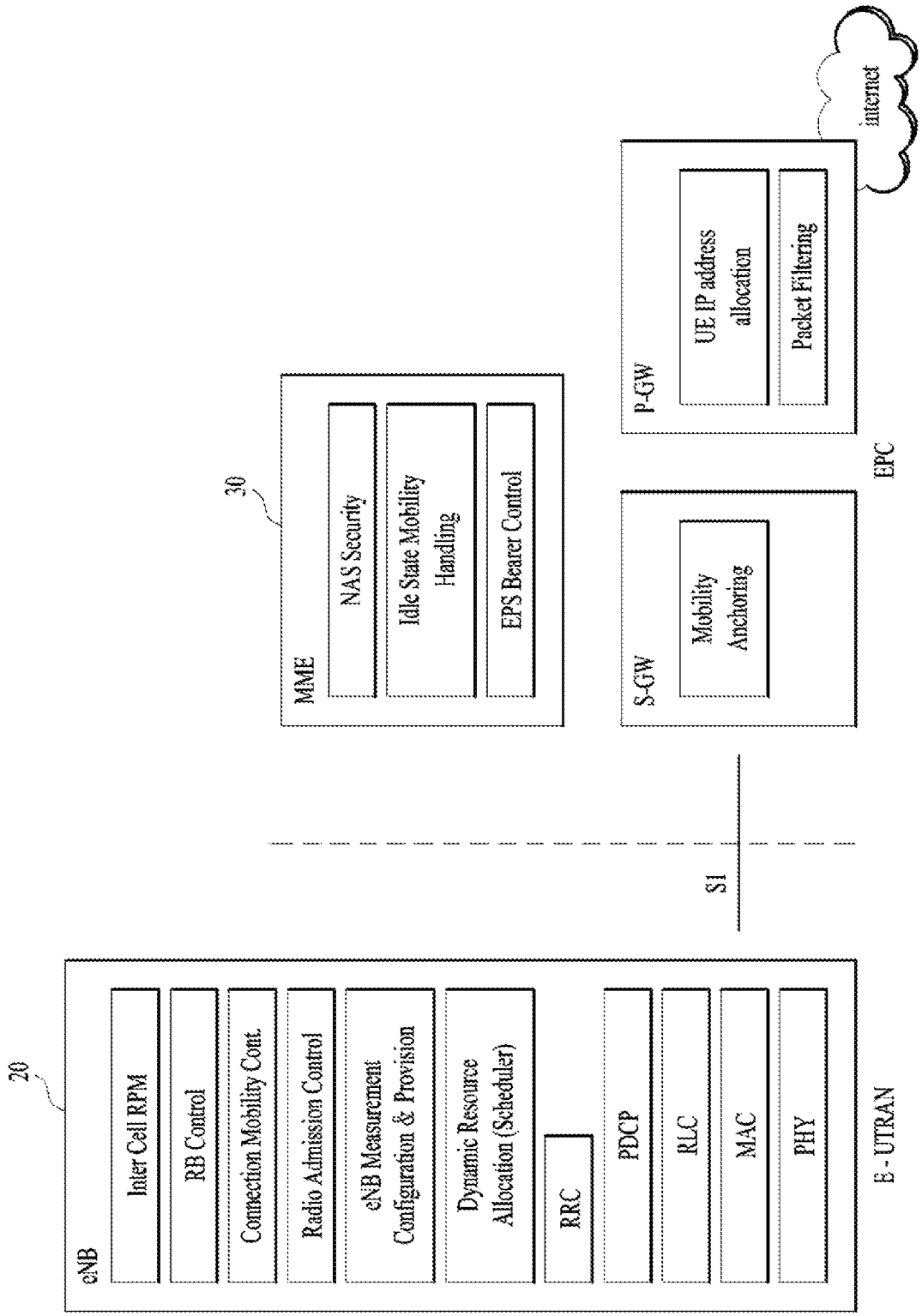
FIG. 2 is a block diagram depicting architecture of a typical E-UTRAN and a typical EPC.
Figure 3:
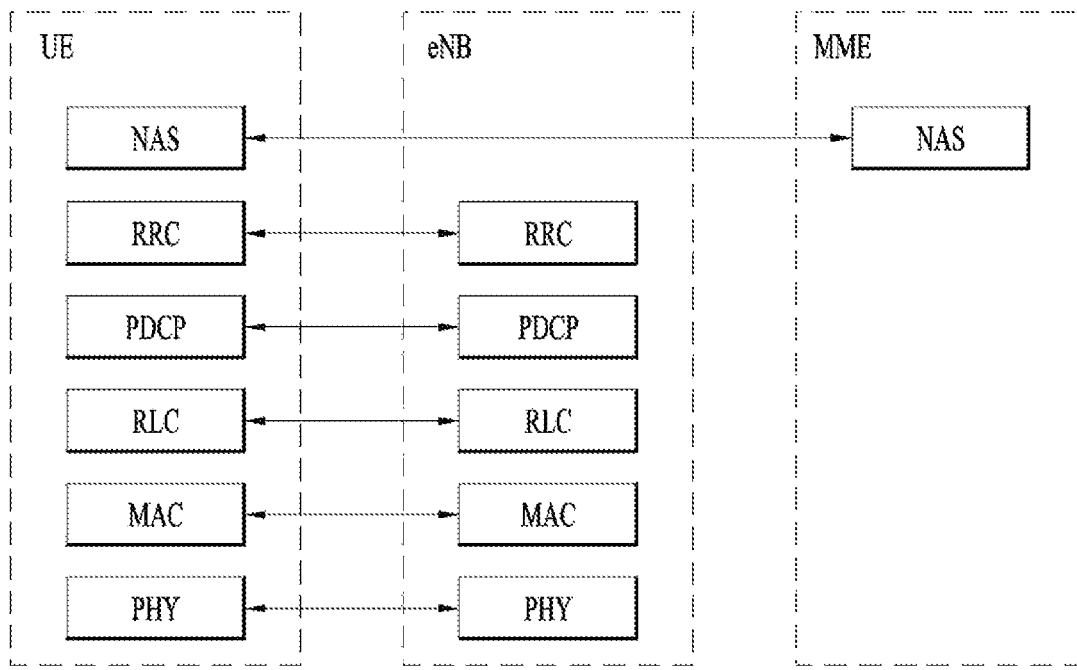
FIG. 3 is a diagram showing a control plane and a user plane of a radio interface protocol between a UE and an E-UTRAN based on a 3GPP radio access network standard.
Figure 3:
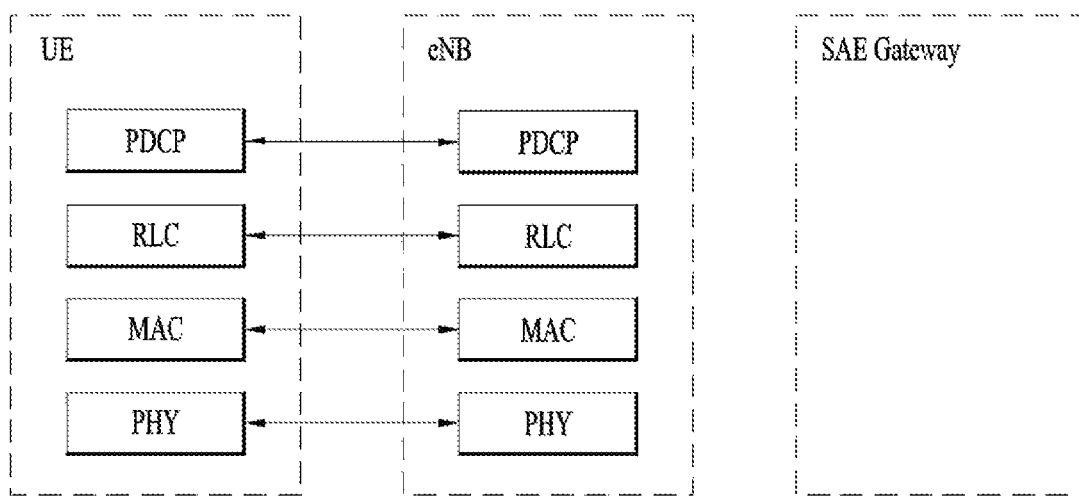

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

Buffer Status Report (BSR)

Description related to buffer status reporting of 3GPP LTE/LTE-A standard document is as following.

The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG (Logical Channel Group).

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the MAC entity has data available for transmission for any of the logical channels which belong to a LCG, in which case the BSR is referred below to as "Regular BSR";

periodicBSR-Timer expires, in which case the BSR is referred below to as "Periodic BSR".

For Regular BSR:

if the BSR is triggered due to data becoming available for transmission for a logical channel for which logicalChannelSR-ProhibitTimer is configured by upper layers:

start or restart the logicalChannelSR-ProhibitTimer;

else:

if running, stop the logicalChannelSR-ProhibitTimer.

For Regular and Periodic BSR:

if more than one LCG has data available for transmission in the TTI where the BSR is transmitted: report Long BSR;

else report Short BSR.

For Padding BSR:

if the number of padding bits is equal to or larger than the size of the Short BSR plus its subheader but smaller than the size of the Long BSR plus its subheader:

if more than one LCG has data available for transmission in the TTI where the BSR is transmitted: report Truncated BSR of the LCG with the highest priority logical channel with data available for transmission;

else report Short BSR.
  else if the number of padding bits is equal to or larger than the size of the Long BSR plus its subheader, report Long BSR.
For NB-IoT:
  if rai-Activation is configured, and a buffer size of zero bytes has been triggered for the BSR, and the UE may have more data to send or receive in the near future (FFS):
    cancel any pending BSR.
If the Buffer Status reporting procedure determines that at least one BSR has been triggered and not cancelled:
  if the MAC entity has UL resources allocated for new transmission for this TTI:
    instruct the Multiplexing and Assembly procedure to generate the BSR MAC control element(s);
    start or restart periodicB SR-Timer except when all the generated BSRs are Truncated BSRs;
    start or restart retxB SR-Timer.
  else if a Regular BSR has been triggered and logical-ChannelSR-ProhibitTimer is not running:
    if an uplink grant is not configured or the Regular BSR was not triggered due to data becoming available for transmission for a logical channel for which logical channel SR masking (logicalChannelSR-Mask) is setup by upper layers:
      a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart retxB SR-Timer upon indication of a grant for transmission of new data on any UL-SCH.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR, except for NB-IoT. A Padding BSR is triggered for a specific MAC PDU only and the trigger is cancelled when this MAC PDU has been built.

Buffer Status Report MAC Control Elements

FIG. 4 is a diagram illustrating a short BSR and Truncated BSR MAC control element, FIG. 5 is a diagram illustrating a long BSR and Truncated BSR MAC control element.

Buffer Status Report (BSR) MAC control elements consist of either:
  Short BSR and Truncated BSR format: one LCG ID field and one corresponding Buffer Size field (as shown in the FIG. 4); or
  Long BSR format: four Buffer Size fields, corresponding to LCG IDs #0 through #3 (as shown in the FIG. 4).
The fields LCG ID and Buffer Size are defined as follow.

The Table 1 illustrates a buffer size levels for BSR.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

The Table 2 illustrates extended Buffer size levels for BSR.

TABLE 2

| Index | Buffer Size (BS) value [bytes] |
|---|---|
| 0 | BS = 0 |
| 1 | 0 < BS <= 10 |

TABLE 2-continued

| Index | Buffer Size (BS) value [bytes] |
|---|---|
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

LCG ID: The Logical Channel Group ID (LCG ID) field of the FIG. 4 identifies the group of logical channel(s) which buffer status is being reported. The length of the field is 2 bits. For NB-IoT, the LCG ID is set to #0.

Buffer Size: The Buffer Size field identifies of the FIG. 4 the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified. The size of the RLC and MAC headers are not considered in the buffer size computation. The length of this field is 6 bits. If extendedBSR-Sizes is not configured, the values taken by the Buffer Size field are shown in the Table 1. If extendedB SR-Sizes is configured, the values taken by the Buffer Size field are shown in the Table 2.

The BSR formats are identified by MAC PDU subheaders with LCIDs as specified in the Table 2.

The existing LTE BSR framework is used as baseline for NR BSR framework. Further enhancements at least related to numerologies and granularity and can be further discussed. Single logical channel can be mapped to one or more numerology/TTI duration. ARQ can be performed on any numerologies/TTI lengths that the LCH is mapped to. The RLC configuration is per logical channel without dependency on numerology/TTI length. Logical channel to numerology/TTI length mapping can be reconfigured via RRC reconfiguration. A single MAC entity can support one or more numerology/TTI durations. Logical Channel Prioritization (LCP) takes into account the mapping of logical channel to one or more numerology/TTI duration.

Sidelink BSR MAC Control Elements

Figures 7, 8:
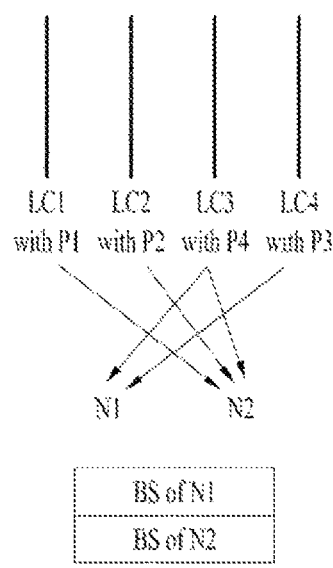
FIG. 7 is a diagram illustrating sidelink BSR and Truncated sidelink BSR MAC control element for odd N.
FIG. 8 is a diagram illustrating the embodiment 1 according to the present invention.

FIG. 6 is a diagram illustrating Sidelink BSR and Truncated Sidelink BSR MAC control element for even N, FIG. 7 is a diagram illustrating Sidelink BSR and Truncated Sidelink BSR MAC control element for odd N.

Sidelink BSR and Truncated Sidelink BSR MAC control elements consist of one Destination Index field, one LCG ID field and one corresponding Buffer Size field per reported target group.

The Sidelink BSR MAC control elements are identified by MAC PDU subheaders with LCIDs as specified in table 3. They have variable sizes.

The Table 3 illustrates values of LCID for UL-SCH.

TABLE 3

| Index | LCID values |
|---|---|
| 00000 | CCCH |
| 00001-01010 | Identity of the logical channel |
| 01011 | CCCH |
| 01100 | CCCH |
| 01101-10011 | Reserved |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

For each included group, the fields are defined as follows (FIGS. 6 and 7):

Destination Index: The Destination Index field identifies the ProSe Destination or the destination for V2X sidelink communication. The length of this field is 4 bits. The value is set to the index of the destination reported in destinationInfoList or v2x-DestinationInfoList and if multiple such lists are reported, the value is indexed sequentially across all the lists in the same order;

LCG ID: The Logical Channel Group ID field identifies the group of logical channel(s) which buffer status is being reported. The length of the field is 2 bits.

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified respectively. The size of the RLC and MAC headers are not considered in the buffer size computation. The length of this field is 6 bits. The values taken by the Buffer Size field are shown in Table 1.

R: Reserved bit, set to "0".

Buffer Sizes of LCGs are included in decreasing order of the highest priority of the sidelink logical channel belonging to the LCG irrespective of the value of the Destination Index field.

In OFDM system, numerology refers to OFDM Subcarrier Spacing (OFDM SCS), Cyclic Prefix (CP) length, Transmission Time Interval (TTI) length, sampling time, OFDM symbol duration, and so on. Among these, at least TTI length will be used in NR MAC in order to meet the requirement of data transmission, for instance, short TTI (sTTI) will be used for scheduling ultra-reliable and low-latency communication (URLLC) data. For this, there will be a mapping between a logical channel and numerology, multiple numerologies can be mapped to a logical channel. With this mapping, logical channel data can be transferred by using only the uplink resource with the mapped numerology.

In order to schedule uplink resource with proper numerology, the network needs to know the amount of data that can be transmitted by using the uplink resource with a numerology. One simple way to do this is to report BSR per numerology.

Embodiment 1

In embodiment 1, a UE may be configured with a logical channel which is mapped to at least two numerologies. When the UE generates a BSR, the UE includes the buffer size of a numerology to the BSR in decreasing order of the priority of the numerology regardless of a logical channel priority considered in the buffer size of the numerology.

The UE may receive information related to logical channel configuration (variously called as logical channel configuration information, etc.) from a network (e.g., gNode B). The logical channel configuration information may include information related to a plurality of numerologies mapped to each logical channel. The logical channel configuration information may include (1) information of the logical channel identity and (2) information of one or more numerologies mapped to each logical channel.

The UE may receive numerology priority configuration information from the network. The numerology priority configuration information may indicate as following information.

A numerology of shorter TTI length has higher priority than a numerology of longer TTI length.

A numerology of wide OFDM subcarrier spacing has higher priority than a numerology of narrow OFDM subcarrier spacing.

A specific numerology has an associated priority;

When the UE triggers a BSR or BSR is triggered, the UE generates the BSR MAC CE by including the buffer size (BS) of a numerology in decreasing order of a numerology priority as following method.

The buffer size (BS) of the numerology having the highest numerology priority is included first to the BSR, and followed by the buffer size (BS) of the numerology having the next highest numerology priority. For example, if numerology1 (N1) is the highest priority and numerology 2 (N2) is next highest priority (i.e., priority level, N1>N2), the buffer size (BS) of N1 is included first to the BSR, and followed by the buffer size (BS) of N2.

The buffer size (BS) of the numerology is included only when the buffer size (BS) of the numerology is non-zero, i.e., there is data available for transmission from a logical channel which is counted in the BS of the numerology.

If uplink grant is not enough to include the buffer size (BS) of all numerology with non-zero BS, the UE may truncate the BSR MAC CE in increasing order of numerology priority. In other words, the UE does not include a buffer size (BS) of a numerology with lower numerology priority but the UE includes a buffer size (BS) of a numerology with higher numerology priority in the BSR MAC CE. For example, if numerology 1 (N1) is the highest priority and numerology 2 (N2) is next highest priority (i.e., priority level, N1>N2) and uplink grant is not enough to include the buffer size (BS) of N1 and N2, the UE may truncate the BSR MAC CE by truncating buffer size information of N2 to according to increasing order of numerology priority.

The UE may truncate the BSR MAC CE, the truncated BSR MAC CE includes as many numerologies having non-zero buffer size (BS) as possible by taking the uplink grant size into account.

FIG. 8 is a diagram illustrating the embodiment 1 according to the present invention.

A UE may receive logical channel configuration information from a network (e.g., gNode B). The logical channel configuration information includes information related to a plurality of numerologies mapped to each logical channel. Referring the FIG. 8, numerology 1 (N1) is mapped to logical channel 3 (L3) and logical channel (L4) and numerology 2 (N2) is mapped to logical channel 1 (L1) and logical channel 2 (L2).

The UE may receive information related to numerology priority (e.g., variously called as numerology priority configuration information, numerology priority information, etc.) from the network (e.g., gNode B). Assume that priority of N1 is higher than priority of N2. The UE may be configured with logical channels (e.g., LC1, LC2, LC3, and LC4). As shown in FIG. 8, the priority of the logical channels (LC1, LC2, LC3, and LC4) is represented as P1, P2, P4, and P3, respectively. The priority of the logical channels is in decreasing order of P1, P2, P3, and P4, i.e., P1 has the highest priority and P4 has the lowest priority.

When the UE triggers a BSR or the BSR is triggered, for BSR MAC CE, the UE calculates a buffer size (BS) of each numerology. When the UE calculates the buffer size (BS) of each numerology, buffer size (BS) of N1 is calculated as the sum of buffer size (BS) of LC3 and LC4 by the UE. Buffer size (BS) of N2 is calculated as the sum of buffer size (BS) LC2, LC3 and LC4 by the UE. The UE check numerology priority of N1 and N2. Since priority of N1 is higher than that of N2, the UE first includes the buffer size (BS) of N1 to BSR, and followed by the buffer size (BS) of N2. The UE transmits the generated BSR (e.g., as type of BSR MAC CE) to the network.

Embodiment 2

The embodiment 2 may be implemented by combination of embodiment 1 as above-described. In embodiment 2, a UE may be configured with a logical channel which is mapped to at least two numerologies. When the UE generates a BSR, the UE includes the buffer size of a numerology to the BSR in decreasing order of the highest priority of the logical channel considered in the buffer size of the numerology.

The UE may receive logical channel configuration information from a network (e.g., gNode B). The logical channel configuration information may include (1) information of the logical channel identity and (2) information of one or more numerologies mapped to each logical channel.

When the UE triggers a BSR or the BSR is triggered, the UE generates the BSR MAC CE by including a buffer size (BS) of a numerology in decreasing order of the highest priority of the logical channel considered in the buffer size (BS) of the numerology. The buffer size (BS) of a numerology having the highest priority of the logical channel is included first to the BSR, and followed by a buffer size (BS) of the numerology having the next highest priority of the logical channel. The logical channel has data available for transmission. The logical channel is the logical channel of which amount of data is calculated into the buffer size (BS) of the numerology. If the logical channel is mapped to the numerology but the amount of the logical channel is not calculated into the buffer size (BS) of the numerology, the UE doesn't take the priority of the logical channel into account when checking the highest priority of logical channel for a numerology.

If uplink grant is not enough to include the buffer size (BS) of all numerology with non-zero buffer size (BS), the UE truncates the BSR MAC CE in increasing order of numerology priority, i.e., the UE does not include a buffer size (BS) of a numerology with lower numerology priority but the UE includes a buffer size (BS) of a numerology with higher numerology priority in the BSR MAC CE. For example, if numerology 1 (N1) is the highest priority and numerology 2 (N2) is next highest priority (i.e., priority level, N1>N2) and uplink grant is not enough to include the buffer size (BS) of N1 and N2, the UE may truncate the BSR MAC CE by truncating buffer size information of N2 to according to increasing order of numerology priority. The UE truncates the BSR MAC CE, the truncated BSR MAC CE includes as many numerologies having non-zero buffer size (BS) as possible by taking the uplink grant size into account.

Figure 9:
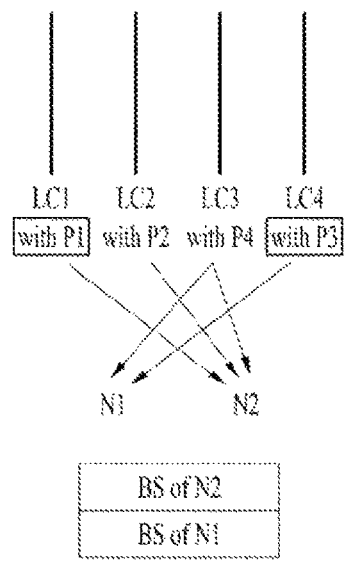
FIG. 9 is a diagram illustrating the embodiment 2 according to the present invention.

FIG. 9 is a diagram illustrating the embodiment 2 according to the present invention.

A UE may receive logical channel configuration information from a network (e.g., gNode B). The logical channel configuration information includes information related to one or more numerologies mapped to each logical channel Referring the FIG. 9, numerology 1 (N1) is mapped to logical channel 3 (L3) and logical channel (L4), and numerology 2 (N2) is mapped to logical channel 1 (L1), logical channel 2 (L2), and logical channel 3 (L3).

The UE may receive information related to numerology priority (e.g., variously called as numerology priority configuration information, numerology priority information, etc.) from the network (e.g., gNode B). Assume that priority of N1 is higher than priority of N2. The UE may be configured with logical channels (e.g., LC1, LC2, LC3 and LC4). As shown in FIG. 9, the priority of the logical channels (LC1, LC2, LC3, and LC4) is represented as P1, P2, P4, and P3, respectively. The priority of the logical channels is in decreasing order of P1, P2, P3, and P4, i.e., P1 has the highest priority and P4 has the lowest priority.

The UE triggers a BSR. For BSR MAC CE, when the UE triggers a BSR and the BSR is trigged, the UE calculates a buffer size (BS) of each numerology. When calculating the buffer size (BS) of each numerology, the buffer size (BS) of N1 is calculated as sum of buffer size (BS) of LC3 and LC4 by the UE. The buffer size (BS) of N2 is calculated as sum of LC1, LC2, and LC3 by the UE. The UE checks what logical channel is a highest priority in logical channels of N1 and what logical channel is a highest priority in logical channels of N2. Referring to FIG. 9, a highest priority in logical channels of N1 is P3, a highest priority in logical channels of N2 is P1. Thus, the UE first includes the buffer size (BS) of N2 followed by the buffer size (BS) of N1 as the highest priority of logical channel of N1, i.e., P3, is lower than the highest priority of logical channel of N2, i.e., P1. The UE transmits the generated BSR (as type of BSR MAC CE) to the network.

Figure 10:
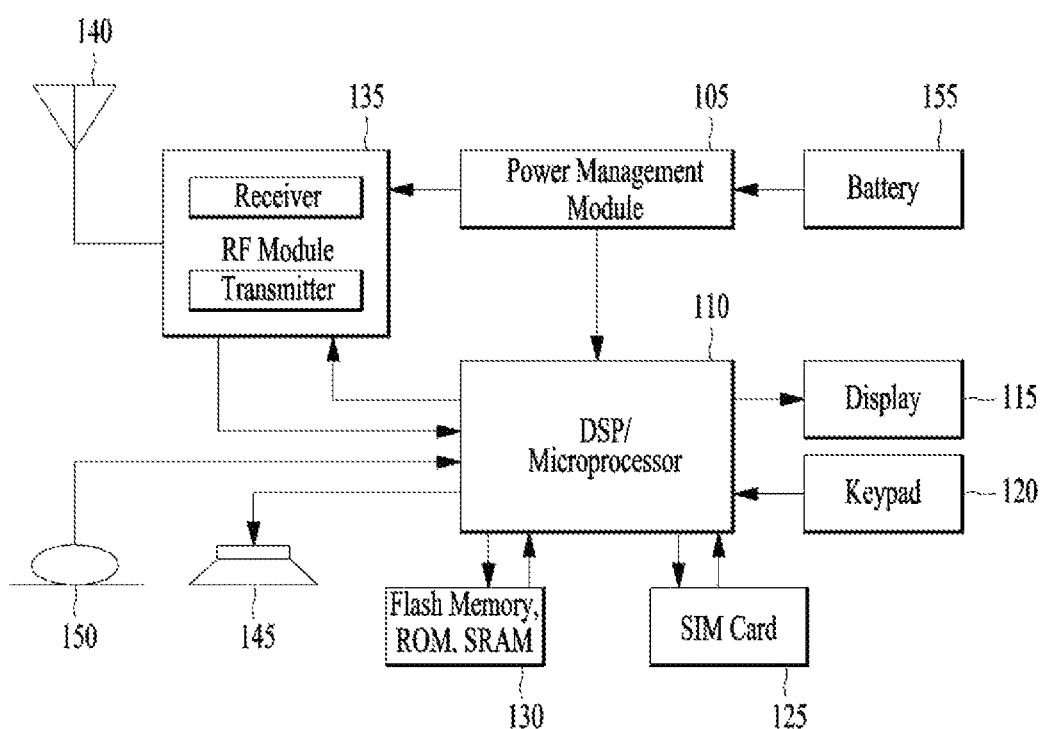
FIG. 10 is a block diagram of an apparatus (e.g., communication apparatus) according to an embodiment of the present invention.

FIG. 10 is a block diagram of an apparatus (e.g., communication apparatus) according to an embodiment of the present invention.

The apparatus shown in FIG. 10 can be a user equipment (UE) and/or eNB adapted to perform the above mechanism, but it can be any apparatus for performing the same operation.

As shown in FIG. 10, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 10 may represent a UE comprising a receiver (135) configured to receive signal from the network, and a transmitter (135) configured to transmit signals to the network. The receiver and transmitter can constitute the transceiver (135). The UE further comprises a processor (110) connected to the transceiver (135: receiver and transmitter).

Also, FIG. 10 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Apparatus and method for generating a buffer status report (BSR) are applicable to a variety of wireless communication systems, e.g. IEEE system, in addition to the 3GPP system.

What is claimed is:

1. A method for a user equipment (UE) generating a buffer status report (BSR), the method comprising:
receiving logical channel configuration information from a network, the logical channel configuration information including information related to a plurality of numerologies mapped to each logical channel;
when the BSR is triggered, calculating a buffer size of each numerology based on the logical channel configuration information; and
generating a BSR including buffer size information of at least one numerology in decreasing order of numerology priority regardless of a logical channel priority,
wherein buffer size information of a first numerology having a highest numerology priority is first included in the BSR, and followed by buffer size information of a second numerology having a next highest numerology priority.

2. The method of claim 1, wherein the numerology priority is configured by the network.

3. The method of claim 1, wherein the numerology priority of a numerology is determined by the UE based on a highest logical channel priority of the logical channels which are mapped to the numerology,
wherein the logical channel priority is configured by the network.

4. The method of claim 3, wherein priority of a first numerology mapped to a first set of logical channels is higher than that of a second numerology mapped to a second set of logical channels if a highest logical channel priority of the first set of the logical channels is higher than a highest logical channel priority of the second set of the logical channels.

5. The method of claim 1, wherein the generating comprises truncating buffer size information of at least one numerology in increasing order of numerology priority when an uplink grant is not enough to include buffer size information of each of numerologies in the BSR.

6. The method of claim 1, further comprising:
transmitting the BSR to the network.

7. The method of claim 1, wherein the calculating the buffer size of each numerology comprises:
calculating a first sum of buffer sizes of logical channels mapped to a first numerology; and
calculating a second sum of buffer sizes of logical channels mapped to a second numerology.

8. A user equipment (UE) generating a buffer status report (BSR), the UE comprising:
a receiver configured to receive logical channel configuration information from a network, the logical channel configuration information including information related to a plurality of numerologies mapped to each logical channel;
a processor configured to:
when the BSR is triggered, calculate a buffer size of each numerology based on the logical channel configuration information; and
generate a BSR including buffer size information of at least one numerology in decreasing order of numerology priority regardless of a logical channel priority,
wherein buffer size information of a first numerology having a highest numerology priority is first included in the BSR, and followed by buffer size information of a second numerology having a next highest numerology priority.

9. The UE of claim 8, wherein the numerology priority is configured by the network.

10. The UE of claim 8, wherein the processor is configured to determine numerology priority of a numerology based on a highest logical channel priority of the logical channels which are mapped to the numerology,
wherein the logical channel priority is configured by the network.

11. The UE of claim 8, wherein priority of a first numerology mapped to a first set of logical channels is higher than that of a second numerology mapped to a second set of logical channels if a highest logical channel priority of the first set of the logical channels is higher than a highest logical channel priority of the second set of the logical channels.

12. The UE of claim 8, wherein, for the generating, the processor is configured to truncate buffer size information of at least one numerology in increasing order of numerology priority when an uplink grant is not enough to include buffer size information of each of numerologies in the BSR.

13. The UE of claim 8, wherein, for calculating the buffer size of each numerology, the processor is configured to:

calculate a first sum of buffer sizes of logical channels mapped to a first numerology; and calculate a second sum of buffer sizes of logical channels mapped to a second numerology.

\* \* \* \* \*